United States Patent Office 3,677,990
Patented July 18, 1972

3,677,990
STABLE AQUEOUS EMULSIONS CONTAINING A TERPOLYMER OF VINYL ALCOHOL, A VINYL ESTER AND AN N-VINYLLACTAM
Eugene S. Barabas, Watchung, Frederick Grosser, Midland Park, and Louis Schneider, Elizabeth, N.J., assignors to GAF Corporation, New York, N.Y.
No Drawing. Filed Aug. 12, 1970, Ser. No. 63,306
Int. Cl. C08f 1/13, 19/00, 45/34
U.S. Cl. 260—29.6 WB  5 Claims

ABSTRACT OF THE DISCLOSURE

A stable emulsion is disclosed of a graft terpolymer of an N-vinyllactam, vinyl alcohol and a vinyl ester with water as the external phase. Among the vinyllactams is N-vinyl pyrrolidone. Vinyl esters include vinyl acetate. The vinyllactam and vinyl alcohol copolymer forms the main chain of the terpolymer.

---

The present invention relates in general to stable aqueous emulsions and in particular to stable aqueous emulsions comprising a grafted terpolymer containing N-vinyllactam, vinyl ester and vinyl alcohol units.

Grafter copolymers comprising a basic homopolymer chain containing grafted thereon units or a plurality of units of one or more polymerizable monomers represent an interesting and important development in the resin arts, particularly since such grafted polymers find immediate and practical utility for the resin chemists to utilize them as "building block" resin systems or "module" resin systems which can be employed to "tailor-make" subsequent resin systems to suit specific industrial needs. Grafted copolymers of terpolymers have been made heretofore by a variety of polymerization methods including solution, emulsion or bulk polymerization and the like. In the case of polymeric N-vinyl lactams and, particularly polyvinyl pyrrolidone, the use of the polymers has been limited to a great extent to those fields of utility which take advantage of the inherent physical characteristics of polyvinyl pyrrolidone, the most important of which is its water solubility. While this physical characteristic of water solubility has projected polymers of polyvinyl pyrrolidone into a position of prominence for such industrial applications as pharmaceutical, cosmetic, textile, and lithographic uses, it conversely has precluded their use in industrial applications where water-insolubility of the resin is a prerequisite.

Accordingly, it is an object of this invention to provide water insoluble compositions based on terpolymers of N-vinyl lactams.

Another object of this invention resides in the provision of stable aqueous emulsions comprising terpolymers containing units of N-vinyl lactams, vinyl esters and vinyl alcohol.

Still another object of this invention resides in the provision of stable aqueous emulsions or latex comprising a grafted polymeric N-vinyl lactam containing vinyl esters and vinyl alcohol wherein the units of the N-vinyl lactam and the vinyl alcohol form the main chain of the copolymer with the vinyl ester units grafted thereon.

Still other objects and advantages of the present invention will become further apparent as the description thereof proceeds.

In accordance with the above defined objects and advantages, methods have been devised according to the present invention whereby stable aqueous emulsions or lattices are provided which comprise terpolymers containing units of an N-vinyl lactam, a vinyl alcohol and vinyl ester. Also provided by the present invention is an improved process for producing said graft terpolymer emulsions which comprises subjecting a mixture of the said N-vinyl lactams, vinyl alcohol and vinyl ester to emulsion polymerization at an elevated temperature and in the presence of a polymerization initiator.

As a result of the invention upon which the present discovery is based, the lattices produce thereby find immediate and practical applicability for use as cast films which are transparent, colorless and flexible. The films, which are deposited from the emulsions obtained as a result of the invention, are strong and clear and are capable of being produced directly upon evaporation of the solvent at room temperatures. Such materials are eminently useful as protective coatings, impregnants, and permanent sizing agents for paper, leather and the like. A particularly advantageous feature of the products resides in the fact that the emulsion lattices of the present invention can be dehydrated and thereafter re-dispersed by merely stirring with water, thereby avoiding the cost of shipping water in the lattices. Still other useful applications of the emulsions of the invention include their use where high oil resistance is a prerequisite. The polymers of this invention may be crosslinked through the hydroxyl group of the vinyl alcohol units, e.g. by reacting them with di-acids, anhydrides, aldehydes, etc.

The novel emulsions of the invention are preferably produced by the emulsion polymerization of a copolymer of the N-vinyllactam and the vinyl alcohol with a vinyl ester monomer. The copolymer of the N-vinyllactam and vinyl alcohol is formed from a copolymer of the N-vinyllactam and a vinyl ester prior to introduction into the emulsion polymerization by any standard chemical process such as hydrolysis, transesterification, and the like. In the polymerization process, the copolymer of the N-vinyllactam/vinyl alcohol copolymer is introduced into an aqueous system and the vinyl ester monomer added thereto. The polymerization therefore occurs between the N-vinyllactam/vinyl alcohol copolymer and the vinyl ester monomer. The particular reaction which occurs represents an important feature of the present invention as it is believed that the arrangement of the respective units in the final product gives rise to the unique properties and characteristics of the final product.

While not desiring to be bound by any particular theory or mechanism of reaction, it is believed that the arrangements of the respective units in the final product include the unit formed by the N-vinyllactam/vinyl alcohol copolymer in the main chain of the polymer. The vinyl ester units are then grafted onto the main chain.

The N-vinyllactams utilized in the preparation of the polymeric compositions of this invention are characterized by the following general structural formula:

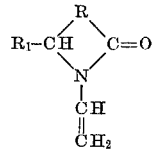

wherein R represents an alkylene bridge group necessary to complete a five, six or seven-membered heterocyclic ring system and $R_1$ represents a member selected from the group consisting of hydrogen, alkyl, aryl, aralkyl, and alkaryl groups. The materials characterized by the foregoing general formula are commercially available and are generally called N-vinyllactams. Preferred compounds falling within this general class include the N-vinyl pyrrolidones, specifically N-vinyl pyrrolidone and the 5-alkyl-N-vinyl pyrrolidones.

In forming the terpolymers of this invention, the above-described N-vinyllactams are reacted with vinyl esters, then later is transformed to vinyl alcohol by methods known in the art to produce a copolymer consisting of N-vinyllactam and vinyl alcohol monomeric units. As the vinyl alcohol reactant is unknown in the monomeric state because of the inherent instability of the compound, it is necessary to produce this copolymer by generation of the vinyl alcohol units by chemical processes such as hydrolysis and transesterification of, for example, the corresponding ester and in a preferred embodiment of this aspect of the invention, the vinyl alcohol units are generated after the copolymerization of the N-vinyllactam with vinyl ester followed by hydrolysis or transesterification of the ester group of the copolymer. This procedure may be carried out, for example, by reaction of vinyl acetate with a base, such as sodium hydroxide, to generate the vinyl alcohol. The product produced as a result of this procedure is a copolymer containing more or less alternating units of the N-vinyllactam and vinyl alcohol which copolymer forms the main chain of the terpolymers produced in the process of this invention.

The third component employed to produce the terpolymers of this invention comprises a vinyl ester which may be represented by the following structural formula:

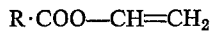

wherein R is an alkyl group of about one to eighteen carbon atoms, preferably one to seven carbon atoms. A preferred compound falling within the above-described class is vinyl acetate and the invention will be described hereinafter with reference to the use of this material.

As pointed out hereinabove, the terpolymers of this invention are formed by initially producing a copolymer of the N-vinyllactam and vinyl alcohol. Thereafter the N-vinyllactam/vinyl alcohol copolymer and the vinyl acetate reactant are dissolved or dispersed in an aqueous solution in the desired concentrations in the presence of a catalyst for initiation of the polymerization reaction. As pointed out hereinabove, the polymerization reaction occurs by grafting a side chain of the vinyl acetate units onto the copolymer main chain formed previously from the N-vinyllactam and the vinyl alcohol.

It is contemplated that the final composition of the grafted terpolymer can be varied over a wide range by the utilization of the copolymer and the vinyl acetate monomer in different ratios, as for example, by varying the ratio of substrate copolymer and vinyl acetate monomer or by varying the initial ratios of the materials in forming the substrate copolymer. In this manner latices of different properties may easily be obtained.

The polymerization is carried out in the presence of a catalyst for initiation of the reaction. It has been found that free-radical producing catalyst systems may be satisfactorily employed for this purpose. It is contemplated that various types of free-radical type catalysts may be employed in the invention including the per-compounds, such as organic and inorganic peroxides including, for example, benzoyl peroxide, cumene hydroperoxide, hydrogen peroxide, acetyl peroxide, lauroyl peroxide, etc., and persulfates such as alkali metal persulfates, including ammonium and potassium persulfates. Also perborates and the azobisnitriles may be employed as the free-radical catalyst in the process of the invention. Moreover, mixtures of these catalyst materials may be employed if desired. It has been found that a particularly preferred catalyst for promotion of the polymerization reaction of this invention is the ammonium persulfates as these materials are employed in the illustrated embodiments.

The catalyst concentration in the reaction system is not necessarily a critical feature of the invention. Thus, the amount of catalyst or initiator can be varied over a wide range but advantageously is present in an amount from about .01 to 2.0 weight percent based on the total weight of materials being polymerized.

The temperature at which the polymerization reaction is advantageously carried out can be varied over a wide range of from about 30° C. and lower to about 100° C. and higher. However, it is preferred to conduct the graft polymerization reaction at a temperature of about 50° to 75° C. preferably 60° to 65° C. in order to avoid an undesirably violent reaction. Also, it has been found that graft polymerization temperatures of about 60° to 65° C. provide products having the desirable physical characteristics of latex viscosity stability and molecular weight.

The reaction is normally carried out in a reaction vessel under a blanket of an inert gas such as nitrogen, argon and the like, and at about atmospheric pressure. Additionally, the polymerization is conducted in the essential absence of free oxygen in order to provide optimum conditions for the graft polymerization reaction to proceed.

If desired, an activating agent such as an alkali metal sulfite or bisulfite, for example, sodium, potassium, etc., can be added to the polymerization mixture in which case lower polymerization temperatures may be employed. Additionally, chain regulators such as hexyl, cetyl, dodecyl, etc., mercaptans can be employed in the reaction. Furthermore, suitable surface active agents may be added to the mixture in order to facilitate solubilization of the vinyl ester.

The emulsion products resulting from the reaction can be compounded with additives such as pigments, salts, wetting agents, resins, waxes and the like, thus providing a wide spectrum of products having varied industrial applications.

It has also been found that the stable emulsions of the class described above can be prepared without the use of emulsifying agents or protective colloids, athough it has been observed that it is preferable to add such materials to the emulsion recipe in order to obtain high conversion and greater stability of the resultant emulsions.

The following examples will serve to illustrate the practice of the invention.

EXAMPLE 1

The apparatus employed for this example comprised a five-liter reaction flask equipped with mechanical stirrer, reflux condenser, thermometer and dropping funnel.

The flask was charged with 1900 ml. methanol and 450 g. PVP/VA S–630 (copolymer of 60 parts N-vinyl-2-pyrrolidone and 40 parts vinylacetate) was added. Stirring was started. When the solution was clear it was heated to gentle reflux. At this point the addition of a 5% sodium methylate solution in methanol was started. The sodium methylate solution was added in 2½ hours at reflux temperature (65° C.). When the addition was over the mixture was kept in gentle reflux for further 1 hour. After that the reflux condenser was replaced by a Liebig condenser, and 1700 ml. was removed by distillation. The residue was precipitated in ether. The ether was evaporated, and the precipitate was dried in vacuo. The yield was 350 g. (96.4%).

The absence of carbonyl peak in the infrared spectrum of the product indicated that the transesterification was complete.

EXAMPLE 2

The apparatus employed for this example comprised a 1-liter resin kettle equipped with mechanical stirrer, reflux condenser, dropping funnel, gas inlet tube, sampling tube and a thermometer.

The reaction was conducted by charging 191.5 ml. of water and 60.0 grams of the vinyl pyrrolidone/vinyl alcohol copolymer obtained from Example 1 to the reaction flask and commencing stirring. The flask was then heated to 70° C. under nitrogen. At this temperature 73.3 g. vinylacetate was added. After that 5 g. of a 6.6% ammonium persulfate solution in water was added through the condenser, which was then rinsed with 2 grams of water. The formation of emulsion could be noticed almost immediately. The temperature (70° C.) was held for one-half hour then it was lowered to 60° C. The mixture was then stirred at 60° C. to 65° C. for two hours whereupon an additional 2.5 grams of ammonium persulfate was added to the reaction mixture. (After each catalyst addition the condenser was rinsed with 2 ml. water.) Stirring was again continued for an additional two hours whereupon 2.5 grams of a 6.6% ammonium persulfate solution was again added to the reaction mixture. The stirring was then continued for an additional one hour and 2.5 grams of a 6.6% ammonium persulfate solution again was added to the reaction mixture, while maintenaining the temperature at 60° C. to 65° C. Thereafter, the reaction mixture was stirred at 60° C. to 65° C. for seventeen additional hours making a total reaction time of 22 hours.

At the conclusion of the reaction, the mixture was cooled and analyzed, the analysis yielding the following results:

| | |
|---|---|
| Solids, percent | 40.0 |
| Residue, percent | None |
| Conversion, percent | 100 |
| Brookfield visc. (cps.) | 533.0 |

The graft terpolymer obtained from these examples was dissolved in a solvent, such as dimethylformamide, and cast upon a support. After drying to remove solvent, there remained a film which was colorless, flexible and water resistant.

In a similar manner other polymeric N-vinyllactams and vinyl esters of the classes described supra can be employed in place of the materials described in the examples with similar result.

Reference in the specification and claims to parts, proportions and percentages, unless otherwise specified, refer to parts, proportions and percentages by weight.

It is obvious that numerous changes and modifications may be made in the above-described specific embodiments without departing from the spirit and nature of the invention. Therefore, it is to be understood that all such changes and modifications are to be included within the scope of the invention and the invention is not to be considered as limited except as set forth in the appended claims.

What is claimed is:

1. A stable emulsion comprising water and a graft terpolymer of vinyl alcohol, a vinyl ester and an N-vinyllactam represented by the formula:

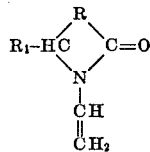

wherein R represents an alkylene bridge containing from two to four carbon atoms and $R_1$ represents a member selected from the group consisting of hydrogen, alkyl, aryl, alkaryl and aralkyl groups.

2. An emulsion according to claim 1 wherein the vinyl ester is vinyl acetate.

3. An emulsion according to claim 1 wherein the N-vinyllactam and the vinyl alcohol form a copolymer as the main chain of the terpolymer product, while the sidechains consist of the units of the vinyl esters.

4. An emulsion according to claim 1 wherein the N-vinyllactam is N-vinyl pyrrolidone.

5. A graft terpolymer as defined in claim 1 wherein units of said vinyl ester are grafted to a main chain comprising said N-vinyllactam and vinyl alcohol.

References Cited

UNITED STATES PATENTS

| | | |
|---|---|---|
| 2,890,199 | 6/1959 | McNuity et al. _ 260—29.6 RW X |
| 3,053,801 | 9/1962 | Bingham et al. _ 260—29.6 RW X |
| 3,402,987 | 9/1968 | Dalton et al. __ 260—29.6 RW X |
| 3,468,831 | 9/1969 | Barabas et al. __ 260—29.6 RW |
| 3,488,312 | 1/1970 | Barabas et al. ___ 260—29.6 RW |

OTHER REFERENCES

Chem. Abstracts, vol. 55, 1961, 8881c–d, Okamura et al.

Chem. Abstracts, vol. 61, 1964, 13441h, Ushakov et al.

HOWARD E. SCHAIN, Primary Examiner

U.S. Cl. X.R.

260—29.6 RW, 875, 885